United States Patent [19]

Hinke

[11] Patent Number: 4,503,391
[45] Date of Patent: Mar. 5, 1985

[54] ROTARY ANGULAR POSITION SENSOR WITH MAGNET AND POLE DISK ASSEMBLY MOUNTED ON ROTATABLE SHAFT

[75] Inventor: Walter Hinke, Ludwigsburg, Fed. Rep. of Germany

[73] Assignee: Robert Bosch GmbH, Stuttgart, Fed. Rep. of Germany

[21] Appl. No.: 434,180

[22] Filed: Oct. 14, 1982

[30] Foreign Application Priority Data

Mar. 11, 1982 [DE] Fed. Rep. of Germany ....... 3208721

[51] Int. Cl.³ .................. G01B 7/14; G01P 3/487
[52] U.S. Cl. .................... 324/208; 123/418; 310/68 B; 324/174
[58] Field of Search .............. 324/208, 173, 174; 310/156, 68 B; 340/686; 123/418

[56] References Cited

U.S. PATENT DOCUMENTS

| | | | |
|---|---|---|---|
| 3,427,485 | 2/1969 | Dotto | 310/164 |
| 3,505,879 | 4/1970 | Vanderberg | 324/174 X |
| 3,626,223 | 12/1971 | Maier | 324/174 X |
| 3,940,645 | 2/1976 | Takita | 310/156 |
| 4,359,657 | 11/1982 | Matsumoto et al. | 324/174 X |
| 4,385,276 | 5/1983 | Bitzel | 324/174 |

FOREIGN PATENT DOCUMENTS 1576403 1/1981 Fed. Rep. of Germany .
0034755 3/1977 Japan .................. 324/174

Primary Examiner—Gerard R. Strecker
Attorney, Agent, or Firm—Frishauf, Holtz, Goodman & Woodward

[57] ABSTRACT

To provide bipolar needle pulses in which oppositely polarized pulses occur close together to form pulse pairs, with long time intervals between pulse pairs, a pair of pole disks (10, 11) are located on a rotor (91, 12) with a permanent magnet (13) interposed. The disks have radially and axially extending claws (15a, 15b, 16) formed thereon, the axial extensions being directed towards each other, but the claws (15a, 15b) projecting from one disk (10) being arranged in claw element pairs with which the claws (16) from the other disk, and magnetically oppositely polarized, are interdigited. The magnetic field, passing through the air gap between the claws, is sensed by a stationary pick-up such as a Hall sensor, a Wiegand sensor, or a magnetic field plate. When used for ignition timing of an internal combustion engine, the number of interdigited claws may correspond to the number of cylinders, and the claw pairs are spaced closely together so that the time ($t_b$) between oppositely polarized pulse pairs (17, 18) derived from the change in magnetic field upon induction with the sensor, will be large with respect to the timing between oppositely polarized pulses.

9 Claims, 3 Drawing Figures

ROTARY ANGULAR POSITION SENSOR WITH MAGNET AND POLE DISK ASSEMBLY MOUNTED ON ROTATABLE SHAFT

The present invention relates to a rotary position sensor, and more particularly to a sensing element which can be coupled to a rotating shaft, to cooperate with a stationary transducer, and in which, upon passage of the rotary element past the stationary transducer, electrical signals are generated in the stationary transducer accurately determining the shaft position. By counting the electrical signals, with respect to time, the speed of the shaft can be determined.

BACKGROUND

It has been proposed to measure angles of shafts, which rotate away from a reference position, to determine reference markers, rotary speed of a shaft, and the like, by use of sensors in which a magnetic element is coupled to the rotor cooperating with a magnetic field responsive element secured on the stator of the sensor combination. The rotor can be so constructed that a permanent magnet is included between two pole shoes, typically formed as sheet metals presenting pole surfaces, which have claws, the magnetic circuit being closed about an air gap between the claws of the pole shoes. The magnetic field, which passes through the air gap, is sensed by a magnetic field responsive element of the stator, located to be in magnetically coupled relationship thereto, for example in the vicinity of the stator. A system of this kind is described, for example, in German Patent Disclosure Document DE-OS No. 26 49 321.

Sensors which have been used employed, customarily, several pairs of claws distributed over the circumference. The claw pairs are alternately effective with respect to each other. It is difficult in such systems to obtain bipolar signals with low jitter, since only a single predetermined field direction toward the claw pole pairs is generated.

THE INVENTION

It is an object to provide a sensor in which the definite bipolar signals can be generated which have low jitter, and, additionally, provide for a high signal to noise ratio; and more particularly to provide speed and angular position sensors suitable for combination with an internal combustion (IC) engine to provide signals to control the ignition instant of the IC engine.

Briefly, the rotor is constructed in the form of two axially spaced sheet metal elements which form pole shoes, between which a toroidal permanent magnet is retained. The pole shoes have bent-over ends forming claws. The claws of the respective sheet metal pole shoes are bent towards each other. They are so arranged, angularly, that the claw of one of the pole shoes projects in the gap between two claws of the other sheet metal element, located angularly on either side of the claw of the first sheet metal element, thus forming a three-claw group.

The number of claws projecting within the gap may, for example, and in accordance with a preferred feature of the invention, correspond to the number of cylinders of the IC engine. The stationary element of the sensor construction can be a Wiegand transducer, a Hall transducer, or a magnetic field plate element.

The system has the advantage that the magnetic field will be generated in the form of immediately sequential fields of alternate polarity, with a very steep gradient of field passing through null. The high change in field induction results in bipolar signals with minimum jitter, and a particularly high duty ratio. The high duty ratio is of particular advantage when these sensors are used to characterize the angular position or rotary speed of the shaft of an internal combustion (IC) engine.

DRAWINGS

DETAILED DESCRIPTION

Figure 1A:
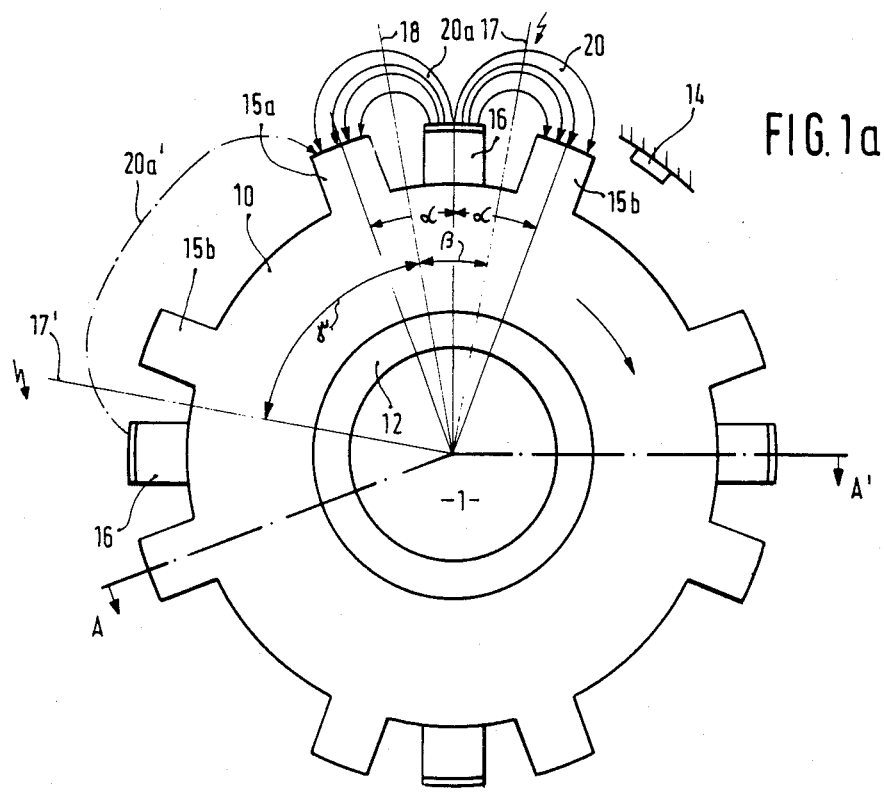
FIG. 1a is a schematic top view of the sensor construction.

A shaft 1, having an axis of rotation 19, carries the rotor component of the transducer system. The rotor component has two pole disks 10, 11 extending radially from the shaft 1 and secured thereto by a hub 12. A toroidal permanent magnet 13 is located between the pole disks 10, 11. The pole disks 10, 11 are formed with claws extending in axial direction towards each other. The claws of the pole disk 10 are formed as claw element pairs 15a, 15b; the claws 16 of pole disk 11 extend in the gap between the pole elements 15a, 15b of the pairs of the claws of the disk 10. The number of the second claws 16, preferably, corresponds to the number of cylinders of an IC engine, if the system is to be used to provide output signals for the ignition system therefor. The claws 16 and the claw pairs 15a, 15b are distributed at regular intervals about the circumference of the disks 10, 11. The number of claw elements 15a, 15b is twice the number of the claws 16, since the claws 15, collectively, are provided in the form of paired elements; the elements 15a, 15b are, in all cases, located at respective sides of the claws 16 of the disk 11.

The arrangement provides for a closed magnetic circuit from the magnet 13 over the disk 11, claws 16, then through the air gap to the claws 15a, 15b, and for return through the pole disk 10 to the magnet 13. The resulting field lines are indicated in FIG. 1a, with 20, 20a, respectively.

A stator with a magnetic field responsive or field sensitive element 14 is located in magnetically coupled relationship with respect to the magnetic field emanating from the claws 15a, 15b and 16. A suitable magnetic field responsive element is a Hall sensor, a Wiegand sensor, or a field plate element. As best seen in FIG. 1a, the magnetic field responsive element 14 is sequentially influenced by the field lines 20, 20a upon rotation of the shaft 1 about a center line 19.

Sensors in accordance with the prior art utilized a pair of claws which were located immediately opposite each other, for example claws 15a and 16. Thus, only a single magnetic field, such as field 20a, with a predetermined direction was provided, since the magnetic field in the other direction, corresponding to the magnetic field 20a'—see FIG. 1a—had to be closed over a comparatively long angular range up to the next claw 16, as indicated in the chain-dotted line in FIG. 1a. Consequently, the signal in the magnetic field responsive element 14 due to the main field 20a only had a short jitter or peak, which was small, that is, of short time duration of one polarity; due to leakage losses and flat passage through null of the magnetic induction in the range 20a', the signal with opposite polarity was generated with wide jitter.

Figure 1B:
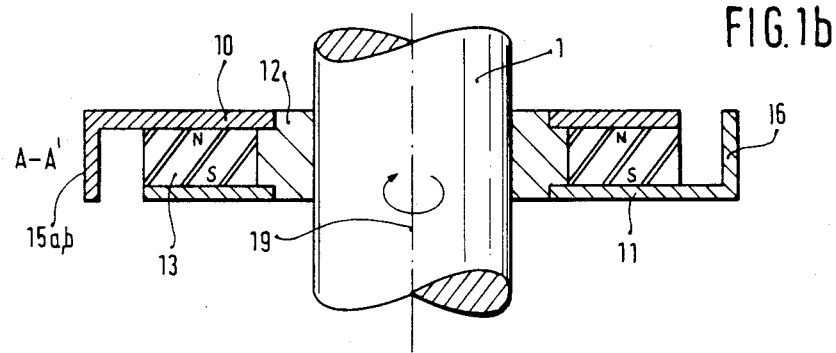
FIG. 1b is a cross-sectional view showing the rotor elements.

In contrast, and as indicated by the solid field lines in FIG. 1, the sensor according to the present invention provides claws 16 which are interdigited between the claw elements 15a, 15b of the first pole sheet 10. In both directions, thus, a clearly defined field 20, 20a will result. The angle α between the center lines of the claws 16 and 15a, 15b, respectively, is so dimensioned that the signal within element 14 will have an optimum output level. The angle α should be small with respect to the angle between respective claws of different pairs, for example between the claws 16. For a four-cylinder engine, the angles between the claws 16 or claws 15b of adjacent pairs will be 90°. When utilizing this sensor for an ignition system, the center line of the angle α causes the signal which triggers an ignition event, as indicated at 17, FIG. 2.

Figure 2:
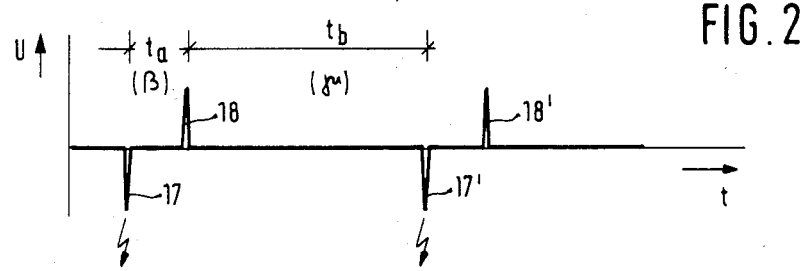
FIG. 2 is a time diagram of the pulses generated by the sensor system.

Operation, with reference to FIG. 2: The timing diagram of FIG. 2 illustrates the generated pulses 17, 18, 17', 18' .... The pulses 17, 17' are generated by the field 20. The pulses 18, 18' are generated by the field 20a. Customary transducers, for example of the type referred to, such as Hall transducers, Wiegand wire field plates, and the like, provide sharp needle-pulse output signals, as illustrated in FIG. 2, with high amplitude.

The time between immediately adjacent pulses 17, 18, corresponding to the angle β, is shown at $t_a$ in FIG. 2. The time being sequential pulses, regardless of polarity, is indicated by the time $t_b$, and the angle is the angle γ. As seen in FIG. 2, a relatively small angle β is followed by a relatively wide angle γ, resulting in a long, and hence large duty cycle $t_b/t_a$.

The relatively long duty cycle is particularly desirable when using such a sensor system to trigger ignition events in IC engines. If the geometry is known, the length of the timing interval $t_a$ or $t_b$ permits determination of the speed of the rotor, and hence the speed of the IC engine. This is important since the time periods $t_a$, $t_b$ have substantial difference from each other, so that erroneous measurements due to possible interchange is prevented. If there were only little difference between the time durations $t_a$ and $t_b$, possible erroneous response of circuitry might result in erroneous measurements; due to the substantial difference, however, the system will respond unambiguously.

The bipolar signals 17, 18 additionally can be used in IC engines to control the dwell time, that is, the time during which ignition current can flow into an ignition coil. In many such installations, a minimum or base time period is determined, which is reduced by well known control circuitry, in dependence on the then pertaining operating parameters of the engine. It is, however, desirable to have a comparatively long base duration for the closing time in order to be able to foreshorten the closing time by the control system. By providing for the relatively long time interval $t_b$, the sensor provides a long time gap between succeeding changes in operating conditions of the sensor system, that is, pulses in opposite directions, which, for example, can characterize the ignition event—see the flash arrow beneath pulses 17, 17'—and beginning of the dwell time or charge interval for the ignition coil for a next spark at time indicated by the pulse 18.

The particular arrangement of the claws or axial projections 15a, 15b, and 16, both with respect to each other and in the disk arrangement as shown, provides for sharply defined bipolar output signals of high amplitude, particularly suitable for control and regulating or adjustment purposes.

Various changes and modifications may be made within the scope of the inventive concept.

I claim:

1. Rotary angular position sensor system, for producing bipolar, low-jitter output signals, adapted to be mounted on a rotatable shaft, said system comprising
   the rotatable shaft (1);
   a first magnetic pole disk (10) and a second magnetic pole disk (11), each mounted on said shaft;
   a magnet located between said pole disks;
   projecting pole shoes (15,16) located at the ends of the pole disks, projecting circumferentially therefrom, and being formed as claws which are axially angled and extending from one pole disk towards the other;
   and a stationary magnetic field responsive element (14) located in magnetically coupled relation with respect to the claws,
   wherein, in accordance with the invention,
   the claws of the first pole disk (10) are circumferentially located on the disk and form spaced pairs of claw elements (15a,15b), in which the elements have identical magnetic polarity and are spaced from each other;
   and each claw (16) of the second disk (11) is circumferentially interdigited between the spaced claw elements (15a,15b) of a pair of the first disk (10), thereby defining a plurality of three-claw groups, in which the spaced claw elements (15a,15b) of each claw group are disposed substantially the same angular distance on either side of the oppositely polarized claw (16) of said second disk (11), and in which said angular distance is small compared to the angular distance between respective claw elements (15b) of adjacent different pairs of claw elements.

2. Sensor system according to claim 1, in combination with an internal combustion engine having a predetermined number of cylinders;
   wherein the number of claws (16) projecting from the second disk (11) corresponds to the number of cylinders of the engine.

3. Sensor system according to claim 1, wherein the stationary magnetic field responsive element (14) comprises a Wiegand element.

4. Sensor system according to claim 1, wherein the field responsive element (14) comprises a Hall sensor.

5. Sensor system according to claim 1, wherein the field responsive element comprises a magnetic field plate element.

6. Sensor element according to claim 2, wherein the stationary magnetic field responsive element (14) comprises a Wiegand element.

7. Sensor system according to claim 2, wherein the field responsive element (14) comprises a Hall sensor.

8. Sensor system according to claim 2, wherein the field responsive element comprises a magnetic field plate element.

9. Sensor system according to claim 1, wherein the angle (α) between the center line of a claw element (15a, 15b) and the interdigited claw (16) projecting from the second pole disk (11) is small with respect to the angle between circumferentially adjacent claws (16) projecting from said second disk (11).

* * * * *